June 22, 1926.
O. A. PENBERTHY
PISTON RING
Filed Dec. 10, 1924
1,589,482
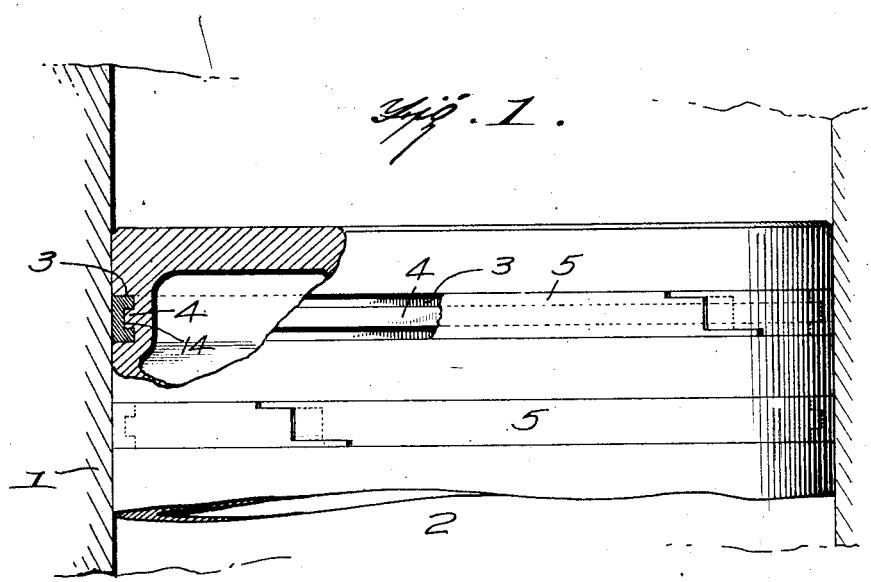
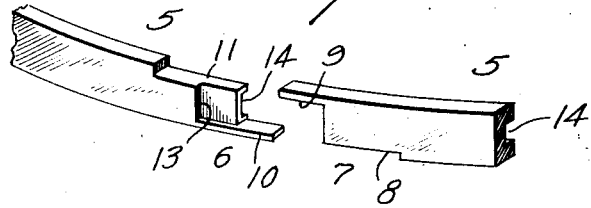
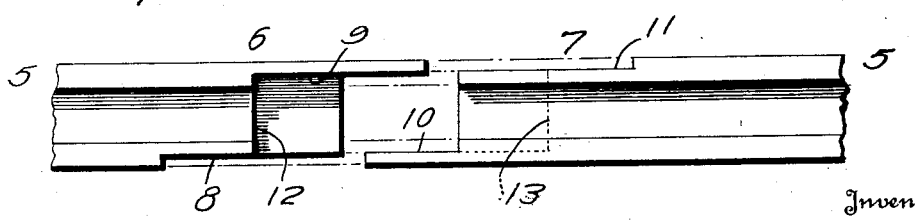
Inventor
O. A. PENBERTHY,
By
Attorney Patented June 22, 1926.

1,589,482

UNITED STATES PATENT OFFICE.

OLIE A. PENBERTHY, OF LEADWOOD, MISSOURI.

PISTON RING.

Application filed December 10, 1924. Serial No. 755,005.

Through actual testing and experience, it has been found that seventy-five per cent of compression and oil pumping in motor cylinders is lost between the ring gap and through the ring receiving groove of the piston and the ring. In fact, the greater portion of this loss is between the ring receiving groove of the piston and the ring and not so much between the ring itself and the cylinder walls as is generally supposed.

Therefore, with this discovery in view, the present invention has for its purpose to provide, in a piston ring construction, an internal groove on the piston ring to receive an annular tongue formed on the bottom of the groove in the piston, this tongue forming an integral part of the piston and of an exact size in the center of the groove and of a depth equal to the depth of the internal groove on the ring, thereby providing a close fit and compact connection between the groove in the piston and the ring, especially when the parts become heated due to the constant explosions of the charges in the combustion chamber of the cylinder, that is, when the parts are heated to proper working temperature. By this construction, it is the aim to obviate the excessive loss of compression and thereby increase the power of the engine.

Another purpose is to provide a stepped overlapped gap or joint between the terminal portions of the piston ring and thereby further obviate the leakage between the ring and the cylinder wall or between the groove in the ring and the piston or between the groove in the piston and the cylinder wall, especially adjacent where the joint or gap occurs.

It is to be remembered that such a ring and piston construction may be made of various dimensions to meet all requirements of the different sizes and types of engine cylinders, without affecting any efficiency or sacrificing the strength of the construction.

A construction of ring and piston when properly designed should compensate one-thousandth of an inch for compression when the parts are heated and with this aim in view an engine cylinder may be equipped with this construction and thereby attain the highest efficiency in motive power.

It is to be understood that the particulars herein given are in no way limitative and that, while still keeping within the scope of the invention, any desired modifications of detail and desired proportions may be made in the device according to the circumstances.

The invention comprises further features and combinations of parts to be hereinafter set forth, shown in the drawings and claimed.

In the drawings:

Figure 1 is a view in section of a portion of a cylinder wall and a piston, showing the ring receiving groove formed in the piston with an annular tongue integral with the bottom of the groove and with a portion of the piston ring in elevation, showing the stepped overlapped gap or joint.

Figure 2 is a detail perspective view of the adjacent terminal portions of the piston ring, looking upon the exterior of the ring and thereby illustrating the construction of the stepped overlapped joint or gap.

Figure 3 is a similar view looking upon the interior of the ring, more clearly defining the construction of the stepped overlapped joint or gap.

Referring to the drawings, 1 designates a cylinder wall, 2 a conventional form of piston mounted therein, the piston being provided with a piston ring receiving groove 3. Formed integral with the bottom of the piston ring receiving groove is an annular tongue 4 which is centrally disposed between the upper and lower walls of the groove 3. Mounted in the groove 3 is a piston ring 5, the terminal portions 6 and 7 of which are overlapped edgewise. There is also a further overlapping, peripherally, of the terminal portions. The terminal 6 is cut away on the side edge, as indicated at 11, to receive the tongue 9 at the side edge of the terminal 7. Similarly, the terminal 7 is cut away on the opposite side edge, as indicated at 8, to receive the correspondingly shaped side tongue of the terminal 6.

Intermediate the overlapping tongues 10 and 9, the terminal portion 6 on the outer face of the ring is provided with an angular cavity or recess 12, while the inner face of the terminal portion 7 has a similar angular cavity or recess 13 so that, when the terminal portions of the ring are brought together in overlapped positions, the outer wall of the angular cavity or recess 13 enters the cavity or recess 12 of the terminal portion 6 while the inner wall of the angular cavity or recess 12 engages the cavity or recess 13. By this construction, it is the aim to avoid and prevent as much as possible any loss of compression at this point.

To further avoid and prevent as much as possible the greater portion of the loss of compression as now exists in engine cylinders, the piston ring has an internal groove 14 of the exact depth to accurately receive the tongue formed in the bottom of the piston ring receiving groove in such manner as to afford a close fit and thereby prevent the loss of compression as well as the loss of oil.

The invention having been set forth, what is claimed is:

A piston ring having a lap joint formed at its connecting terminal portions of which one on one side edge is cut away, the other terminal portion on the same edge having a tongue corresponding to and lying in the place of the cut away portion, said other terminal portion being cut away on the opposite side edge in correspondence with the first terminal which is provided on the same side with a tongue occupying the space of said cut away portion, the first said terminal on the outer face being provided with an angular cavity and the second said terminal on the inner face with a similar cavity, the two cavities respectively receiving the outer and inner peripheral portions of the opposite terminal portions of the ring.

In testimony whereof he affixes his signature.

OLIE A. PENBERTHY.